United States Patent Office 3,159,087
Patented Dec. 1, 1964

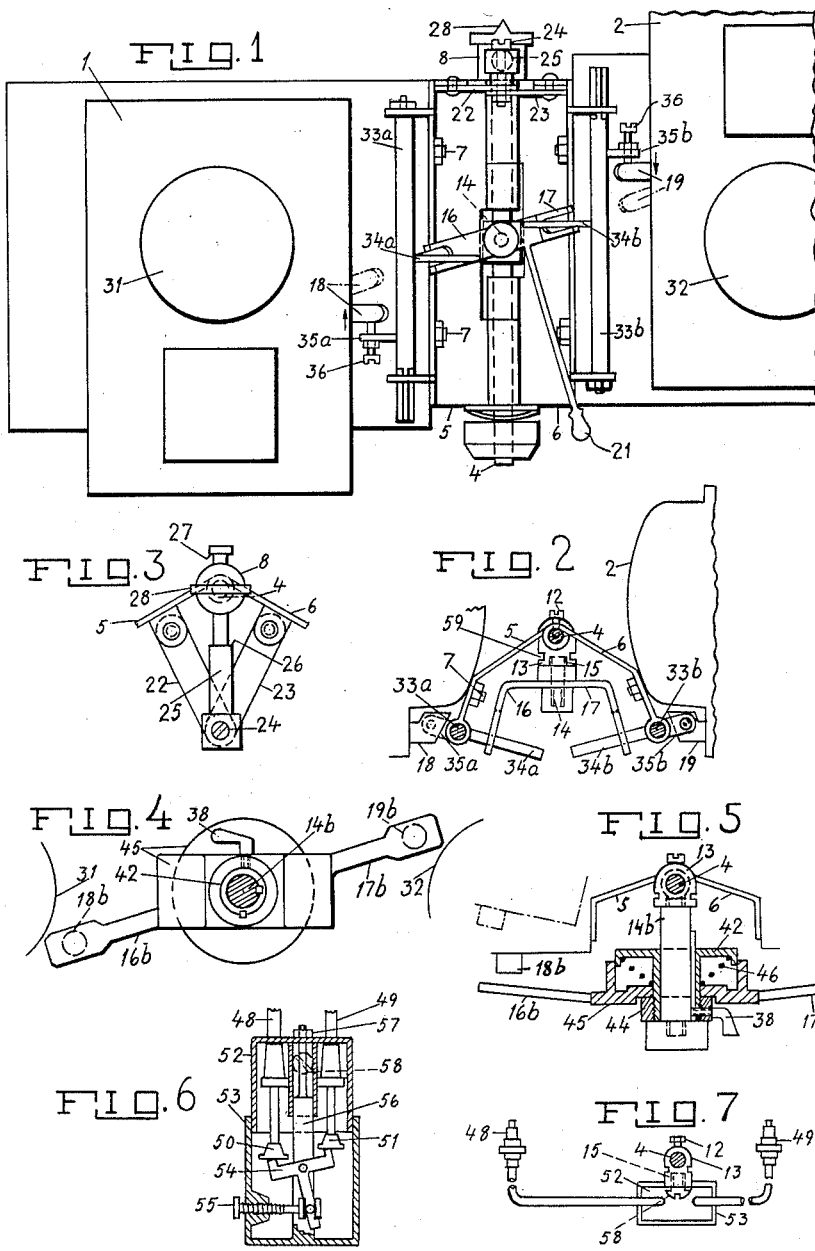

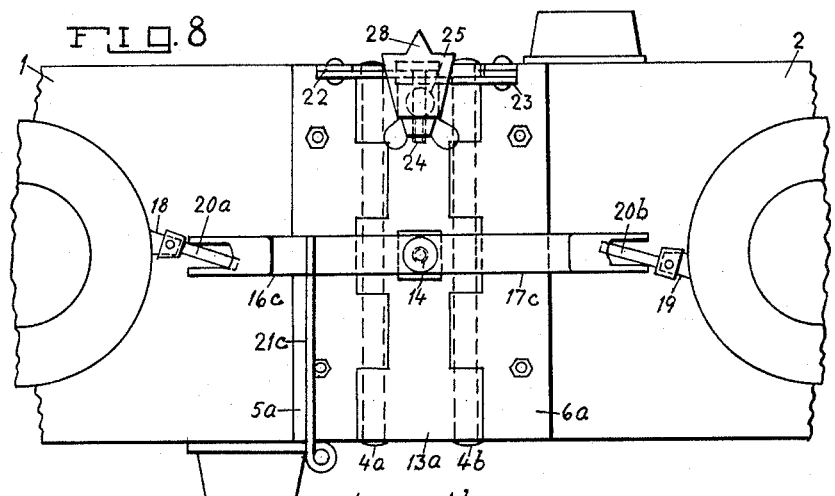
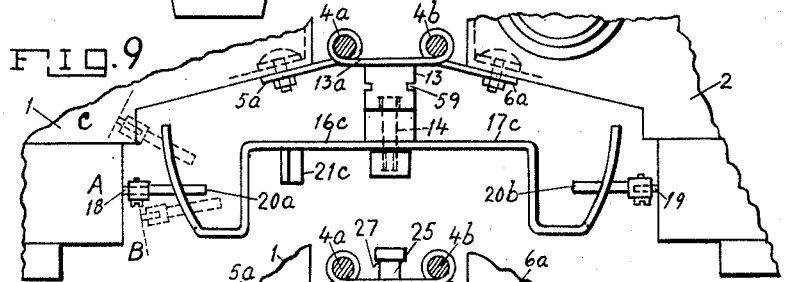
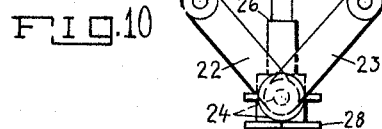
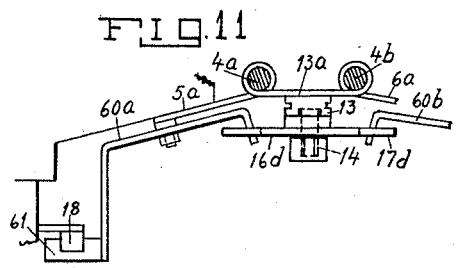
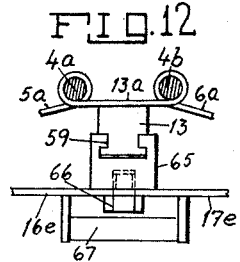

3,159,087
DEVICE FOR PIVOTALLY COUPLING
TWO CAMERAS
Bertil Wanner, N. Fogelbergsgatan 4,
Gothenburg, Sweden
Filed Oct. 23, 1961, Ser. No. 146,937
Claims priority, application Norway, Nov. 1, 1960,
137,829
3 Claims. (Cl. 95—18)

This invention relates to devices for pivotally coupling two cameras for taking stereo and panorama views, and the invention consists of a further development of my copending U.S. patent application Ser. No. 835,949, patented July 24, 1962, No. 3,045,573.

It is an object of this invention to provide a device built up as a unit for pivotally coupling two cameras and based on the principle of my copending application with a widened use for cameras with different constructions of shutter releasers.

A further object of my invention is to provide a device built up as a unit for pivotally coupling two cameras, the use of which does not require any alteration either of the shape of the camera houses or of their shutter releasers.

Still a further object of my invention is to provide a device built up as a unit for pivotally coupling two cameras with an improved hinge device to facilitate the arrangements of the synchronizing mechanism for operation of the shutter releasers.

With these and other objects in view the invention concerns a device for pivotally coupling two cameras, said device being intended to be disposed between them and being provided with a hinge mechanism containing central support members maintained stationarily directed independent of the pivoting of the cameras and serving as support members for the synchronizing mechanism, the structure of the support members permitting various movements of the synchronizing mechanism, such as linear movement in parallelism with the hinge axis direction, movement perpendicular to this direction as well as swingable movement in a plane essentially parallel with the hinge axis direction.

In the accompanying drawings:

FIGURE 1 is a front view of the device in one embodiment for cameras with lever-type shutter releasers, and with a hinge mechanism with one axle.

FIGURE 2 is a plan view of a detail, and

FIGURE 3 a plan view of a further detail thereof.

FIGURE 4 is a front view of the device in another embodiment for cameras with push button-type shutter releasers, and FIGURE 5 a plan view of a detail thereof partly in section.

FIGURE 6 is a cross section of the synchronizing mechanism in a further embodiment for cameras with push button releasers, and FIGURE 7 an elevational view to reduce a scale of the synchronizing mechanism last mentioned.

FIGURE 8 is a front view of the device in a further embodiment with lever-type shutter releasers, and with a hinge mechanism with two axles, FIGURE 9 is a plan view thereof, and FIGURE 10 a plan view of a detail.

FIGURE 11 is a fragmentary plan view of a further embodiment of the synchronizing mechanism for cameras with lever-type shutter releasers, and FIGURE 12 is a fragmentary plan view of yet a further embodiment of the synchronizing mechanism for cameras with shutter releasers which are to be pushed simultaneously in the same direction.

In order to facilitate the following description and to make it easier to understand, the expressions "horizontal" and "vertical" have been used referring to the normal position of the cameras 1 and 2, when taking views, and in accordance therewith the plane through the centre lines of the two camera lenses 31, 32 is called "the central horizontal plane," and the middle plane between the cameras perpendicular to said horizontal plane is called "the central vertical plane."

The device in the embodiment of FIGURES 1 to 3 consists of a hinge mechanism provided with a vertical axle 4 intended to be positioned in the central vertical plane, with two pivotal wings 5, 6 to be secured to the cameras preferably by screw pins 7 in the camera housings which are the sole attachments for the device. The axle 4 has a head 8 at the top, bearing against the upper edges of the wings, and at the bottom a tightening nut urges a frictional washer against the lower edges of the wings to maintain the wings and the cameras in set angle positions. At the middle portion of the axle 4 there is a support 13 fixed to the axle by means of a screw 12 and provided with an axle pin 14 extending horizontally forwards in the central vertical plane whereupon a double-armed lever is mounted and provided with a downwardly extending actuating handle 21. The lever includes the two synchronizing arms 16, 17 swingable simultaneously with respect to the two camera release levers 18, 19.

There is normally no possibility for the synchronizing arms 16 and 17 to directly engage with the release levers 18 and 19 in the extreme divergent angle position of the cameras for panorama views, unless the release levers are provided with extensions. As it is an advantage to leave the release levers unaltered in their original form, the present embodiment has overcome this difficulty by providing a motion transmitting means in the form of a slide 33a, 33b vertically mounted in bearings on each of the wings 5, 6, to move with the wings during turning movements of the cameras and at the same time transmitting the movements of the synchronizing arms 16 and 17 to the release levers 18 and 19. To obtain this result each slide 33a and 33b is provided with a horizontal tongue 34a, 34b received in the preferably fork-shaped end of the corresponding arms 16, 17, and also with horizontal tongues 35a, 35b in position to engage the corresponding release levers 18 and 19 by means of adjusting screws 36. The slides are provided with suitable means to prevent turning in their bearings.

The device is provided with a central guide-directing device. This device consists of two links 22, 23 of the same length positioned in a horizontal plane and pivotally connected each with the corresponding wing 5, 6 and diverging from a common fulcrum pin 24 fixed to one end of a diagonal rod 25, the other end of which is slidably received in the head 8 of the hinge axle 4. Said diagonal rod will always divide the angle between the cameras in two equal halves, and will serve to prevent the axle from turning and thereby maintain the support 13 and the axle pin 14 in a stationary forward direction in the central vertical plane. In accordance therewith the synchronizing arms 16 and 17 will always swing in one and the same plane, in the present case perpendicular to the central vertical plane. This is of importance for proper action of the syncronizing arms. A view finder or a sight 28 fixed to the diagonal rod 25 or to the head 8 will always maintain a direction straight forwards. The diagonal rod 25 may be provided with shoulders 26, 27 abutting against the head 8 to limit the swinging of the cameras in their two extreme positions for stereo views or panorama views.

When a view is to be taken the cameras are set at a desired angle, the actuating rod 21 is operated by the finger of the user and the synchronizing arms 16 and 17 will act upon the slides 33a and 33b, and the slides will transmit the action to the two camera release levers 18 and 19. The return movement of the release levers 18 and 19 will bring the synchronizing arms 16 and 17 back to their initial positions.

In the embodiment of FIGURES 4 and 5 the cameras are provided with push button release means 18b, 19b acted upon by movement of the synchronizing arms 16b, 17b toward the cameras. The axle pin 14b of the support 13 fixed to the hinge axle 4 is provided with a slide 42 mounted thereon carrying a central plate 45 from which the synchronizing arms 16b, 17b extend. Said plate 45 is slidably mounted on the hub of the slide 42 and arranged to be pushed inwards against the resistance of a spring 46 disposed between the plate 45 and slide 42 and thereby act upon the release means 18b and 19b. A ring 44 is screwed on the outer end of the hub of the slide 42 between the plate 45 and an outer head of the axle pin 14b, said ring being provided with a set screw 38 with a finger-manipulating means to secure the slide 42 on the axle pin 14b in the outer position shown as well as in an inner position abutting against the support 13. The slide 42 and the plate 45 are prevented from turning with respect to the pin 14b by keys or other suitable means. In the outer position of the slide 42 the synchronizing arms 16b and 17b will act upon the release means 18b and 19b when the cameras are in an inner or stereo view position. When the slide 42 is pushed inwards and secured in its inner position the synchronizing arms 16b and 17b are in a position to act upon the release means 18b and 19b with the cameras in an outer or diverging position for panorama views.

Instead of being pushed to act upon the release means 18b and 19b the synchronizing arms may be pivotally mounted on the hub of the slide 42 and actuate the release buttons by chamfered ends providing cams, during a pivotal movement of the slide 42 and arms 16b and 17b.

In the embodiments of FIGURES 6 and 7 the cameras are provided with release buttons actuated by flexible cables 48, 49. The cables 48 and 49 are provided with buttons 50, 51 arranged side by side in a housing 52. The housing 52 is provided with a slidable push cap 53 having a double-arm lever 54 pivotally mounted therein, one arm being in contact with one button 50, and the other arm in contact with the other button 51. In order to set the buttons 50, 51 in correct synchronizing positions an adjusting screw 55 is provided to position the lever 54 at different angles. A central rod 56 fixed to the cap 53 extends through the housing and is provided with a nut 57 exteriorly of the housing 52 to limit movement of the cap 53 in a direction away from the housing 52. The housing 52 may be fastened on the support 13 by a screw 58 screwed into the screw hole 15, the cap being preferably directed downwards to be pushed upwards by engagement with a finger of the operator.

The stationary directed support 13 in the central vertical plane may be used as a common support for various types of synchronizing mechanisms for actuating the camera release means. In the embodiments shown the screw hole 15 is threaded to receive the axle pin for the synchronizing arms in the two embodiments of FIGURES 1 to 5, as well as to receive the carrying screw 58 for the synchronizing mechanism of FIGURES 6 and 7. The support 13 may also be provided with vertical grooves 59 or with horizontal grooves such grooves serving as guides for linear slidable movements of synchronizing mechanisms where such movements are used.

The embodiments shown in FIGURES 8 to 12 relate to devices including hinge arrangements having two vertical axles instead of the one axle as described above. This is a double hinge in which one wing 5a is pivotally mounted on axle 4a, and the other wing 6a is pivotally mounted on axle 4b. The wing 5a is secured to camera 1, and the wing 6a is secured to camera 2. A shield 13a extends between the axles 4a and 4b, and is secured to the support 13 in the central vertical plane between the cameras with the axles symmetrically disposed on opposite sides of the support 13.

A guiding device of the same type as described for the previous embodiments is utilized with the device of FIGS. 8 to 10. As shown in FIGURES 8 and 10 the guide device consists of two links 22, 23 pivotally connected to the wings 5a, 6a and to a common central fulcrum pin 24 fixed to one end of a diagonal rod 25 which lies in the central vertical plane and the other end of which is slidably mounted on the shield 13a.

The shield 13a is fixed in a position perpendicular to the central vertical plane and remains in such position irrespective of the angular positions of the cameras and the shield 13a is the equivalent of the head 8 of FIGS. 1 and 3. The shield carries the support 13 for the synchronizing arms 16c, 17c which are pivotally mounted on the axle pin 14 to be operated by the actuating rod 21c in order to transmit movement by means of forkshaped ends to extensions 20a, 20b attached to the release levers 18, 19. This structure permits operation in the three different positions shown in FIG. 9: "A" for normal stereo views, "B" for close-lying stereo views, and "C" for panorama views. The axle pin 14 is threaded into the support 13 or attached in another suitable way. A view finder or sight 28 is attached to the rod 25 and is held in the central vertical plane. Shoulders 26, 27 on the diagonal rod 25 are positioned to abut against the shield 13a to limit movement of the cameras in their extreme angular positions.

The forked ends of the synchronizing arms 16c, 17c are preferably arcuate in shape and disposed to lie in the path of the release lever extensions 20a, 20b in the different angular positions of the cameras as indicated in FIGURE 9 at A, B, and C. In that way the arms 16c and 17c engage the releaser lever extensions 20a and 20b in all camera positions, and the arms 16c and 17c will automatically be returned to their original positions by the release levers 18 and 19.

As seen in FIGURE 9 the swing path for the release lever extension 20a and 20b is comparatively long between the positions B and C and this necessitates the provision of extensions 20a, 20b to permit operation of the release levers 18 and 19. It is, however, possible to eliminate the extensions 20a and 20b by providing intermediate lever member pivotally mounted on the wing between the end of the corresponding synchronizing arm and the release lever 18. This intermediate lever member is shown in FIGURE 11 as a double-arm lever 60a, 60b each being pivotally mounted on the corresponding wing 5a, 6a. One end of each intermediate lever member 60a and 60b is received in the forked end of the corresponding synchronizing arm 16d, 17d, and the other ends 61 engage the release levers 18 and 19. The ends 61 will follow the release levers 18 and 19 during angular movements of the cameras, and the other ends of the intermediate levers 60a and 60b will have little movement relative to the arms 16d and 17d as they are disposed in the immediate vicinity of the corresponding hinge axle 4a, 4b.

Finally FIGURE 12 shows an embodiment where the synchronizing arms 16e, 17e have a vertical linear movement to actuate the release levers 18 and 19. In this case the grooves 59 in the support block 13 serve as guides for a slide 65 on which the synchronizing arms 16e and 17e are secured by a screw 66. A finger engaging plate 67 is attached to the arms 16e and 17e for moving the same preferably against the resistance of a spring not shown, which will assist in returning the arms to their initial position.

The device with two hinge axles has a certain advantage as the shield facilitates the mounting of the synchronizing arms as well as of the guide device in their proper position. The shield also provides a stabilizing effect on the cameras.

As appears evident from the above description the two cameras may be easily coupled together by means of the central coupling device disposed between them without necessitating any change of the camera housings, and each camera may be dismounted to be used as a single normal camera. The coupling device contains all the necessary parts and is provided with guide members to maintain the synchronizing arms as well as a central view finder, if such is desired, in proper position.

It will be obvious to those skilled in the art that various changes may be made in the invention, without departing from the spirit and scope thereof, and therefore the invention is not limited by that which is shown in the drawings and described in the specification, but only as indicated in the appended claims.

What I claim is:

1. A device for pivotally coupling two cameras and providing for simultaneous operation of the shutter releases on said cameras, said device including a hinge mechanism having a single hinge axle disposed in a midvertical plane between the cameras when the lens axes of the cameras are disposed in a horizontal plane and having a pair of pivotally connected wings with one wing secured to one camera and the other wing secured to the other camera, a support member fixed to said axle, a manually actuated arm pivotally mounted on said support member for movement about a horizontal axis, said arm projecting on opposite sides of said support members towards said cameras, holding means for maintaining said support member stationarily directed independent of different angular positions of the cameras relative to each other, said holding means comprising a rod slidably mounted on the hinge mechanism for horizontal movement in the midvertical plane between the two cameras dividing the angle between the cameras in two halves and having one end passing through a portion connected with said support member, a fulcrum pin on the other end of said rod, a link having one end pivotally connected to said pin and the other end pivotally connected to one wing, a second link having one end pivotally connected to said pin and the other end pivotally connected to the other wing, a first slide mounted on one wing, a second slide mounted on the other wing, a tongue projecting from said first slide and engaging one end of said arm, a second tongue projecting from said first slide and engaging the shutter release on one camera, a first tongue projecting from said second slide and engaging the opposite end of said arm, a second tongue projecting from said second slide and engaging the shutter release on the other camera and a manually operable actuating lever fixed to said arm for simultaneously operating the shutter releases within their range of movement in all relative angular positions of the cameras for stereo and panorama views.

2. The device as claim 1, in which the shutter release for each camera includes a release lever, and in which said first and second tongues projecting from said second slide are provided with adjustable means for compensating for different positions of said release levers.

3. The device as claimed in claim 1, in which the opposite ends of said arm are forked and said first tongue projecting from said first slide and said first tongue projecting from said second slide are received in said forked ends.

References Cited in the file of this patent
UNITED STATES PATENTS

| | | |
|---|---|---|
| 1,958,339 | Haberman | May 8, 1934 |
| 2,603,738 | Staehlin | Sept. 9, 1952 |
| 2,841,063 | Park | July 1, 1958 |
| 3,045,573 | Wanner | July 24, 1962 |